United States Patent
Qiu (10) Patent No.: US 10,372,648 B2
(45) Date of Patent: Aug. 6, 2019

(54) DEVICE MANAGEMENT METHOD AND APPARATUS

(71) Applicant: Huawei Technologies Co., Ltd., Shenzhen (CN)

(72) Inventor: Xin Qiu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 15/291,212

(22) Filed: Oct. 12, 2016

(65) Prior Publication Data

US 2017/0031857 A1    Feb. 2, 2017

Related U.S. Application Data

(63) Continuation of application No. PCT/CN2015/080904, filed on Jun. 5, 2015.

(30) Foreign Application Priority Data

Sep. 12, 2014    (CN) .......................... 2014 1 0466446

(51) Int. Cl.
*G06F 13/40* (2006.01)
*G06F 3/06* (2006.01)
(Continued)

(52) U.S. Cl.
CPC .......... *G06F 13/4022* (2013.01); *G06F 3/061* (2013.01); *G06F 3/0655* (2013.01);
(Continued)

(58) Field of Classification Search
None
See application file for complete search history.

(56) References Cited

U.S. PATENT DOCUMENTS

2001/0029529 A1    10/2001    Tachibana et al.
2011/0289355 A1    11/2011    Ren et al.
(Continued)

FOREIGN PATENT DOCUMENTS

CN    101052013 A    10/2007
CN    101083537 A    12/2007
(Continued)

OTHER PUBLICATIONS

Machine Translation and Abstract of Chinese Publication No. CN101335662, Dec. 31, 2008, 3 pages.
(Continued)

*Primary Examiner* — Henry Tsai
*Assistant Examiner* — Aurangzeb Hassan
(74) *Attorney, Agent, or Firm* — Conley Rose, P.C.

(57) ABSTRACT

A device management method and an apparatus. The device management method of the present disclosure includes receiving, by a switching device, diagnostic information sent by a managed device, where the diagnostic information is used to indicate at least one of a software version, a hardware version, or a running status of the managed device; and sending, by the switching device, the diagnostic information to a device management controller. The embodiments of the present disclosure resolve a problem of processing performance deterioration caused by device management performed by a central processing unit (CPU) of a server.

9 Claims, 7 Drawing Sheets

(51) Int. Cl.
*G06F 13/42* (2006.01)
*H04L 12/24* (2006.01)

(52) U.S. Cl.
CPC ........ *G06F 3/0688* (2013.01); *G06F 13/4282* (2013.01); *H04L 41/00* (2013.01); *G06F 2213/0026* (2013.01)

(56) References Cited

U.S. PATENT DOCUMENTS

| | | | |
|---|---|---|---|
| 2012/0047309 A1* | 2/2012 | Natu | H04L 63/101 710/314 |
| 2012/0207155 A1 | 8/2012 | Nelogal et al. | |
| 2013/0346666 A1 | 12/2013 | Chang et al. | |
| 2015/0331473 A1* | 11/2015 | Jreji | G06F 1/3206 713/320 |

FOREIGN PATENT DOCUMENTS

| | | |
|---|---|---|
| CN | 101335662 A | 12/2008 |
| CN | 101409670 A | 4/2009 |
| CN | 101494573 A | 7/2009 |
| CN | 103112476 A | 5/2013 |
| CN | 104202197 A | 12/2014 |
| EP | 1895794 A2 | 3/2008 |

OTHER PUBLICATIONS

Machine Translation and Abstract of Chinese Publication No. CN104202197, Dec. 10, 2014, 3 pages.
Foreign Communication From a Counterpart Application, Chinese Application No. 201410466446.3, Chinese Office Action dated Jan. 24, 2017, 7 pages.
Foreign Communication From a Counterpart Application, European Application No. 15840371.7, Extended European Search Report dated Apr. 21, 2017, 7 pages.
Foreign Communication From a Counterpart Application, PCT Application No. PCT/CN2015/080904, English Translation of International Search Report dated Aug. 5, 2015, 2 pages.
Foreign Communication From a Counterpart Application, PCT Application No. PCT/CN2015/080904, English Translation of Written Opinion dated Aug. 5, 2015, 7 pages.
Machine Translation and Abstract of Chinese Publication No. CN101052013, Oct. 10, 2007, 10 pages.
Foreign Communication From a Counterpart Application, Chinese Application No. 201410466446.3, Chinese Office Action dated Sep. 29, 2017, 7 pages.

* cited by examiner

DEVICE MANAGEMENT METHOD AND APPARATUS

CROSS-REFERENCE TO RELATED APPLICATION

This application is a continuation of International Application No. PCT/CN2015/080904, filed on Jun. 5, 2015, which claims priority to Chinese Patent Application No. 201410466446.3, filed on Sep. 12, 2014. The disclosures of the aforementioned applications are hereby incorporated by reference in their entireties.

TECHNICAL FIELD

Embodiments of the present disclosure relate to computer technologies, and in particular, to a device management method and an apparatus.

BACKGROUND

Non-volatile Memory express (NVMe) is a high-speed transfer protocol applicable to a non-static storage medium and implemented based on a Peripheral Components Interface express (PCIe) technology.

Currently, in a device management method under discussion that uses an NVMe technology, a central processing unit (CPU) of a server reads diagnostic information of an NVMe subsystem by reusing a reserved field in a conventional PCIe protocol, and then the CPU submits the diagnostic information to a baseboard management controller (BMC) via a data bus, for the BMC to perform device management.

However, because work of collecting and forwarding the diagnostic information is assumed by the CPU of the server, CPU resources of the server are occupied. As a result, CPU processing performance of the server deteriorates.

SUMMARY

Embodiments of the present disclosure provide a device management method and an apparatus, to resolve a problem of processing performance deterioration caused by device management performed by a CPU of a server.

According to a first aspect, an embodiment of the present disclosure provides a device management method, including receiving, by a switching device, diagnostic information sent by a managed device, where the diagnostic information is used to indicate at least one of a software version, a hardware version, or a running status of the managed device; and sending, by the switching device, the diagnostic information to a device management controller.

With reference to the first aspect, in a first possible implementation manner of the first aspect, before the receiving, by a switching device, diagnostic information sent by a managed device, the method further includes sending, by the switching device, a first diagnostic information acquiring request to the managed device, so that the managed device sends the diagnostic information to the switching device according to the first diagnostic information acquiring request.

With reference to the first possible implementation manner of the first aspect, in a second possible implementation manner of the first aspect, the sending, by the switching device, a first diagnostic information acquiring request to the managed device, so that the managed device sends the diagnostic information to the switching device according to the first diagnostic information acquiring request includes broadcasting, by the switching device, a first multi-channel transmission platform (MCTP) packet to the managed device, where the first diagnostic information acquiring request is encapsulated in the first MCTP packet, so that the managed device acquires the diagnostic information according to the first diagnostic information acquiring request, and the managed device encapsulates the diagnostic information in a second MCTP packet and sends the diagnostic information to the switching device.

With reference to the second possible implementation manner of the first aspect, in a third possible implementation manner of the first aspect, the receiving, by a switching device, diagnostic information sent by a managed device includes receiving, by the switching device, the second MCTP packet, and parsing the second MCTP packet to obtain the diagnostic information.

With reference to any one of the first aspect or the first to the third possible implementation manners of the first aspect, in a fourth possible implementation manner of the first aspect, before the sending, by the switching device, the diagnostic information to a device management controller, the method further includes receiving, by the switching device, a second diagnostic information acquiring request sent by the device management controller.

With reference to the fourth possible implementation manner of the first aspect, in a fifth possible implementation manner of the first aspect, the receiving, by the switching device, a second diagnostic information acquiring request sent by the device management controller includes receiving, by the switching device, a third MCTP packet sent by the device management controller, where the second diagnostic information acquiring request is encapsulated in the third MCTP packet; and the sending, by the switching device, the diagnostic information to a device management controller includes: encapsulating, by the switching device, the diagnostic information in a fourth MCTP packet according to the third MCTP packet by and sending the diagnostic information to the device management controller.

With reference to any one of the first aspect or the first to the fifth possible implementation manners of the first aspect, in a sixth possible implementation manner of the first aspect, the switching device is a PCIe switching device, the managed device includes at least one of a CPU of a server or a NVMe controller, and the device management controller is a BMC.

According to a second aspect, an embodiment of the present disclosure provides a switching device, including a receiving module configured to receive diagnostic information sent by a managed device, where the diagnostic information is used to indicate a software or hardware version or a running status of the managed device; and a sending module configured to send the diagnostic information to a device management controller.

With reference to the second aspect, in a first possible implementation manner of the second aspect, the sending module is further configured to send a first diagnostic information acquiring request to the managed device, so that the managed device sends the diagnostic information to the switching device according to the first diagnostic information acquiring request.

With reference to the first possible implementation manner of the second aspect, in a second possible implementation manner of the second aspect, the sending module is specifically configured to broadcast a first MCTP packet to the managed device, where the first diagnostic information acquiring request is encapsulated in the first MCTP packet, so that the managed device acquires the diagnostic information according to the first diagnostic information acquiring request, and the managed device encapsulates the diagnostic information in a second MCTP packet and sends the diagnostic information to the switching device.

With reference to the second possible implementation manner of the second aspect, in a third possible implementation manner of the second aspect, the receiving module is specifically configured to receive the second MCTP packet and parse the second MCTP packet to obtain the diagnostic information.

With reference to any one of the second aspect or the first to the third possible implementation manners of the second aspect, in a fourth possible implementation manner of the second aspect, the receiving module is further configured to receive a second diagnostic information acquiring request sent by the device management controller.

With reference to the fourth possible implementation manner of the second aspect, in a fifth possible implementation manner of the second aspect, the receiving module is specifically configured to receive a third MCTP packet sent by the device management controller, where the second diagnostic information acquiring request is encapsulated in the third MCTP packet; and the sending module is specifically configured to encapsulate the diagnostic information into a fourth MCTP packet according to the third MCTP packet and send the diagnostic information to the device management controller.

With reference to any one of the second aspect or the first to the fifth possible implementation manners of the second aspect, in a sixth possible implementation manner of the second aspect, the switching device is a PCIe switching device, the managed device includes at least one of a CPU of a server or a NVMe controller, and the device management controller is a BMC.

With reference to any one of the second aspect or the first to the sixth possible implementation manners of the second aspect, in a seventh possible implementation manner of the second aspect, the switching device further includes an information refresh module configured to adjust diagnostic information refresh frequency of the storage module according to a preset configuration.

According to a third aspect, an embodiment of the present disclosure provides a switching device, including a central processing unit and a memory, where the central processing unit communicates with the memory using a bus, the memory stores a computer executable instruction, and the central processing unit executes the computer executable instruction to execute the method according to any one of the first aspect or the first to the sixth possible implementation manners of the first aspect.

According to the device management method and an apparatus in the embodiments of the present disclosure, a memory and a bus are added to a switching device to collect and store diagnostic information of a managed device, all diagnostic information is then sent to a device management controller, and the device management controller performs device management on the managed device. In this way, a problem of processing performance deterioration caused by device management performed by a CPU of a server is resolved.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Figure 1:
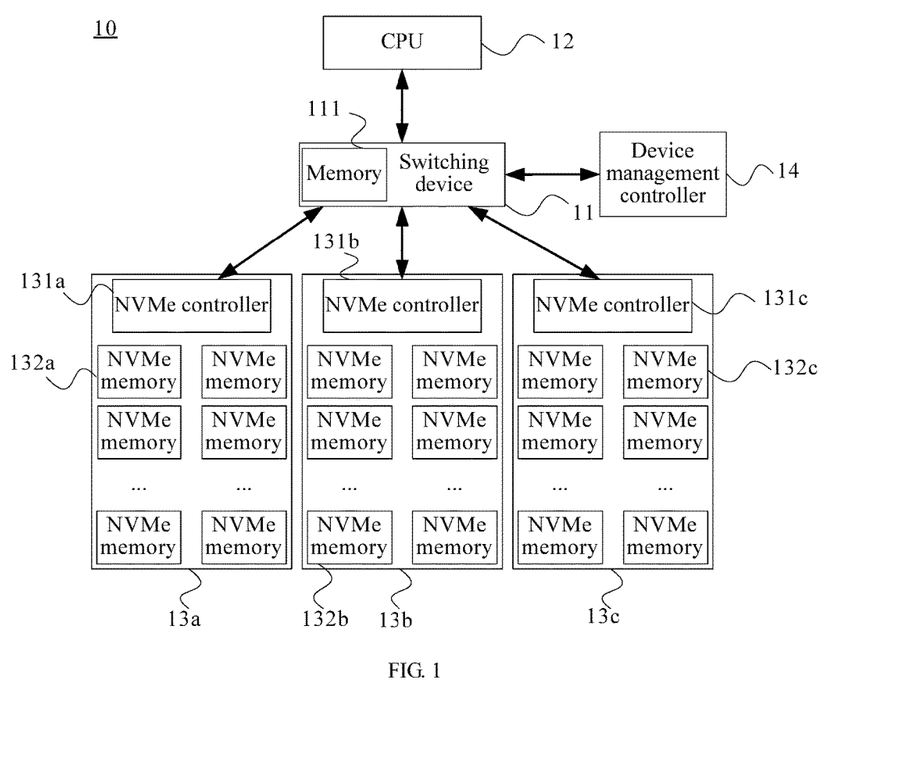
FIG. 1 is a schematic structural diagram of an embodiment of a device management system according to the present disclosure.

FIG. 1 is a schematic structural diagram of an embodiment of a device management system according to the present disclosure. As shown in FIG. 1, the system 10 of this embodiment includes one switching device 11, one CPU 12 of a server, three NVMe subsystems 13a, 13b, and 13c, and one device management controller 14. The CPU 12 of the server and the three NVMe subsystems 13a, 13b, and 13c may all be managed devices. The switching device 11 may be a PCIe switching device or a PCIe switching chip. Persons skilled in the art can readily figure out that any independent device, chip, logical module, or the like having a PCIe switching function may act as the switching device of the present disclosure, which is not specifically limited herein. The device management controller 14 may be preferably a BMC. The NVMe subsystem 13a may include an NVMe controller 131a and multiple NVMe memories 132a, the NVMe subsystem 13b may include an NVMe controller 131b and multiple NVMe memories 132b, and the NVMe subsystem 13c may include an NVMe controller 131c and multiple NVMe memories 132c. The foregoing NVMe memories may be, for example, flash memories (Flash). The NVMe controllers 131a, 131b, and 131c are all connected to the switching device 11 using a second bus. The switching device 11 is connected to the device management controller 14 using a first bus. The first bus may be preferably a system management bus (SMBus) or an inter-integrated circuit (I2C) bus. It should be noted that this embodiment is described using an example of the three NVMe subsystems.

However, a quantity of NVMe subsystems is not limited to three and may be more than one, which is not specifically limited herein. In addition, in specific implementation of the CPU 12 of the server, the switching device 11, and the three NVMe subsystems 13a, 13b, and 13c in this embodiment of the present disclosure, the switching device 11 may be physically independent of the server as an independent device; likewise, the three NVMe subsystems 13a, 13b, and 13c may also each be physically independent of the switching device 11 and the server as an independent device; in addition, the CPU 12, the switching device 11, and the three NVMe subsystems 13a, 13b, and 13c may each be a part of the server; or the switching device 11 and the CPU 12 may be a part of the server, and the three NVMe subsystems 13a, 13b, and 13c are each physically independent of the server. The present disclosure imposes no specific limitation thereon.

In this embodiment, in order that the switching device 11 stores diagnostic information sent by at least one of the CPU 12, the NVMe controller 131a, the NVMe controller 131b, or the NVMe controller 131c, memory space of the switching device is expanded. The memory space of the switching device 11 is a memory 111 specially used for storing the diagnostic information. The memory 111 is configured to store the diagnostic information sent by at least one of the CPU 12, the NVMe controller 131a, the NVMe controller 131b, or the NVMe controller 131c. A size of the storage space of the memory 111 may be configured according to "a maximum quantity of NVMe subsystems that can be supported by the system" and "storage space required by each piece of diagnostic information". For example, if the quantity of NVMe subsystems currently supported by the system is 3, the storage space of the memory 111 is 30 times the storage space required by each piece of diagnostic information. The storage space required by each piece of diagnostic information may dynamically change as an NVMe version changes, and may be configured using a driver for different versions of NVMe subsystems and written into an NVMe controller.

Figure 2:
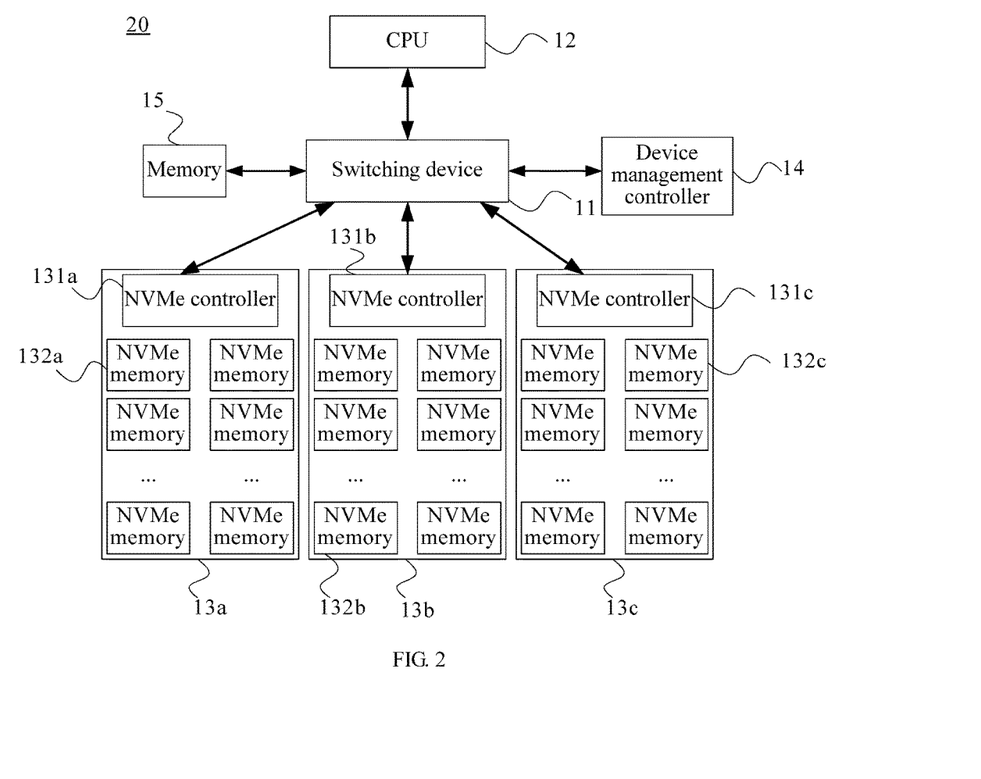
FIG. 2 is a schematic structural diagram of another embodiment of a device management system according to the present disclosure.

FIG. 2 is a schematic structural diagram of another embodiment of a device management system according to the present disclosure. As shown in FIG. 2, a difference between the system 20 of this embodiment and the system 10 shown in FIG. 1 lies in that an external memory 15 is attached to a switching device 11 instead of expanding the internal storage space of the switching device 11. The memory 15 functions the same as the memory 111 shown in FIG. 1, and no further details are described herein.

Figure 3:
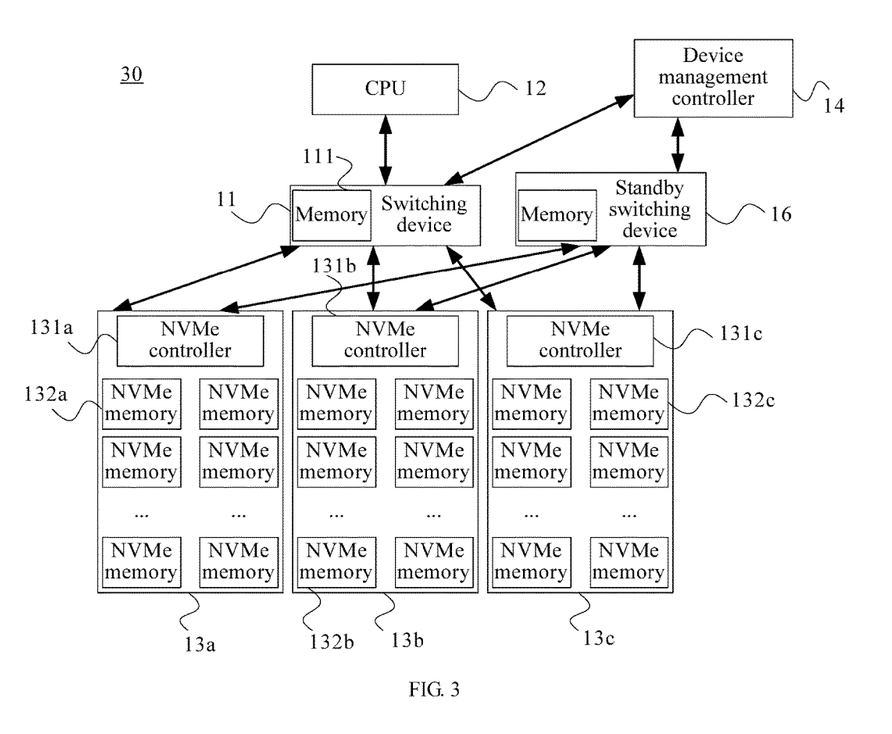
FIG. 3 is a schematic structural diagram of still another embodiment of a device management system according to the present disclosure.

FIG. 3 is a schematic structural diagram of still another embodiment of a device management system according to the present disclosure. As shown in FIG. 3, a difference between the system 30 of this embodiment and the system 10 shown in FIG. 1 lies in that the system 30 of this embodiment further includes a standby switching device 16. The standby switching device 16 is configured to receive and store diagnostic information stored in a switching device 11, and when the switching device 11 fails, substitute for the switching device 11, that is, the standby switching device 16 assumes work that is originally done by the switching device 11. In an implementation manner, the diagnostic information stored in the switching device 11 is sent by a managed device to the standby switching device 16 for storing. In another implementation manner, the diagnostic information stored in the switching device 11 is sent by the switching device 11 to the standby switching device 16 for storing.

Figure 4:
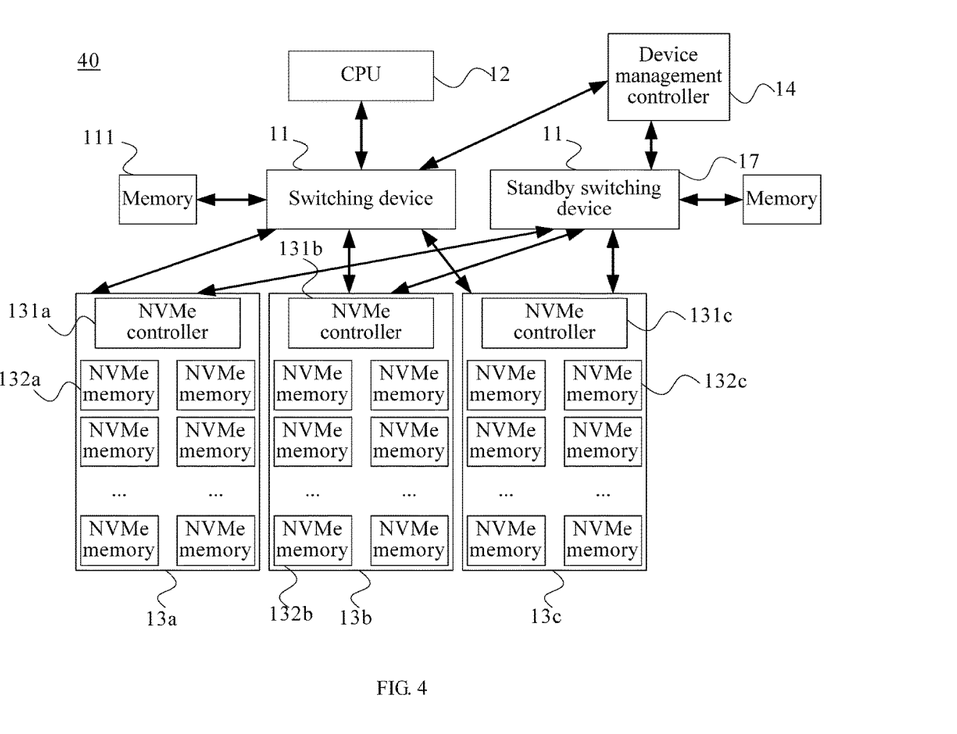
FIG. 4 is a schematic structural diagram of yet another embodiment of a device management system according to the present disclosure.

FIG. 4 is a schematic structural diagram of yet another embodiment of a device management system according to the present disclosure. As shown in FIG. 4, a difference between the system 40 of this embodiment and the system 20 shown in FIG. 2 lies in that the system 40 of this embodiment further includes a standby switching device 17. The standby switching device 17 is configured to receive and store diagnostic information stored in a switching device 11, and when the switching device 11 fails, substitute for the switching device 11, that is, the standby switching device 17 assumes work that is originally done by the switching device 11. In an implementation manner, the diagnostic information stored in the switching device 11 is sent by a managed device to the standby switching device 17 for storing. In another implementation manner, the diagnostic information stored in the switching device 11 is sent by the switching device 11 to the standby switching device 17 for storing.

Figure 5:
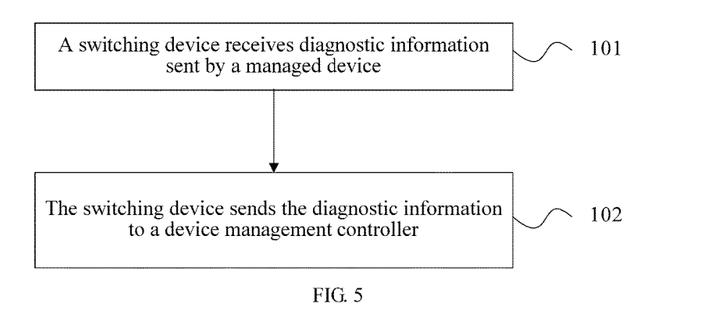
FIG. 5 is a flowchart of an embodiment of a device management method according to the present disclosure.

FIG. 5 is a flowchart of an embodiment of a device management method according to the present disclosure. As shown in FIG. 5, the method of this embodiment is applicable to the system shown in any one of FIG. 1 to FIG. 4. The method may include the following steps.

Step 101: A switching device receives diagnostic information sent by a managed device.

The diagnostic information is used to indicate at least one of a software version, a hardware version, or a running status of the managed device. The switching device of this embodiment may be the switching device 11 in the system shown in any one of FIG. 1 to FIG. 4. The diagnostic information received by the switching device is used to indicate the software or hardware version or the running status of the managed device, and the managed device may be at least one of the CPU 12, the NVMe controller 131a, the NVMe controller 131b, or the NVMe controller 131c in the system shown in any one of FIG. 1 to FIG. 4. The diagnostic information may be, for example, a CPU temperature, an NVMe driver version, or an operating system version. Specific parameter information is subject to an NVMe device management standard, and is not specifically limited herein.

Step 102: The switching device sends the diagnostic information to a device management controller.

Figure 6:
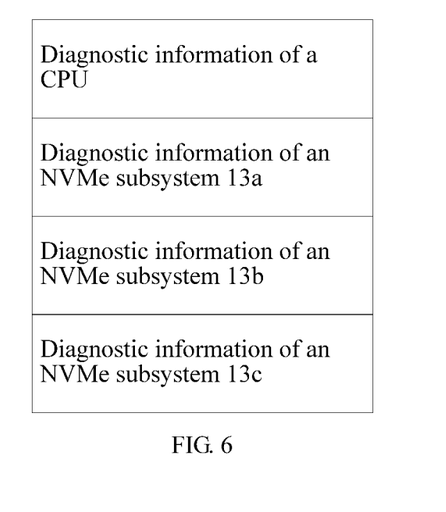
FIG. 6 is a schematic diagram of a spatial layout of a memory.

The diagnostic information of the managed device collected by the switching device is stored in a memory, where the memory may be a memory 111 or a memory 15 in the system shown in any one of FIG. 1 to FIG. 4. FIG. 6 is a schematic diagram of a spatial layout of a memory. A switching device sends the diagnostic information of the managed device to the device management controller using a bus, where the bus may be the first bus in the system shown in any one of FIG. 1 to FIG. 4, and the device management controller may be the device management controller 14 in the system shown in any one of FIG. 1 to FIG. 4. After receiving all diagnostic information, the device management controller may manage the managed device according to an existing BMC management solution, which is not elaborated herein.

In this embodiment, a memory and a bus are added to a switching device to collect and store diagnostic information of a managed device, all diagnostic information is then sent to a device management controller, and the device management controller performs device management on the managed device. In this way, a problem of processing performance deterioration caused by device management performed by a CPU of a server is resolved. In addition, in this embodiment all NVMe subsystems can exchange diagnostic information with the switching device by reusing only an existing bus; no additional system hardware line is added.

Figure 7:
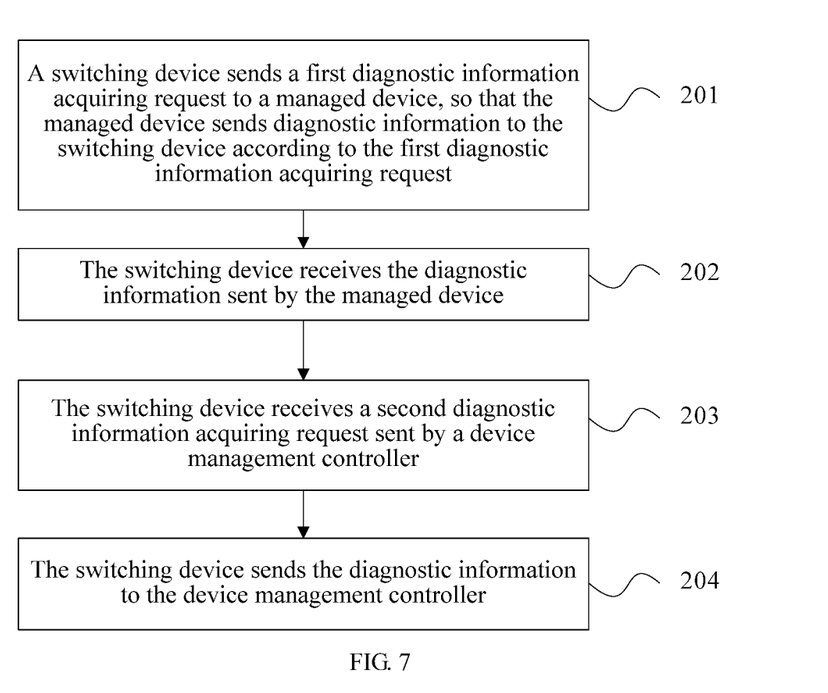
FIG. 7 is a flowchart of another embodiment of a device management method according to the present disclosure.

FIG. 7 is a flowchart of another embodiment of a device management method according to the present disclosure. As shown in FIG. 7, the method of this embodiment is applicable to the system shown in any one of FIG. 1 to FIG. 4. The method may include the following steps.

Step 201: A switching device sends a first diagnostic information acquiring request to a managed device, so that the managed device sends diagnostic information to the switching device according to the first diagnostic information acquiring request.

After the system is powered on and initialization is completed, the switching device may broadcast a first multi-channel transmission platform (MCTP) packet to the managed device. The first diagnostic information acquiring request is encapsulated in the first MCTP packet, so that the managed device acquires the diagnostic information according to the first diagnostic information acquiring request, and the managed device encapsulates the diagnostic information in a second MCTP packet and sends the diagnostic information to the switching device. For example, a switching device obtains an operating system version of a managed device, and therefore encapsulates a first diagnostic information acquiring request corresponding to the information in a first MCTP packet and broadcasts the first MCTP packet. For a field definition of the first MCTP packet, a definition of the NVMe interface working group is used, and the diagnostic information of the managed device is acquired using the standard MCTP protocol. After receiving the first MCTP packet, the managed device parses the packet according to the MCTP protocol provided by the NVMe standardization organization to obtain the diagnostic information, that is, the operating system version, corresponding to the first diagnostic information acquiring request, and then encapsulates the operating system version in a second MCTP packet and sends the operating system version to the switching device.

Step 202: The switching device receives the diagnostic information sent by the managed device.

The switching device receives a second MCTP packet sent by the managed device, and parses the second MCTP packet to obtain the diagnostic information.

In steps 201 and 202, the switching device may separately send a first MCTP packet in which a first diagnostic information acquiring request is encapsulated to a CPU and an NVMe controller, then receive second MCTP packets in which diagnostic information is encapsulated and that are respectively sent by the CPU and the NVMe controller, and store the diagnostic information in a memory according to the space layout shown in FIG. 6.

Step 203: The switching device receives a second diagnostic information acquiring request sent by a device management controller.

The switching device receives a third MCTP packet that is sent by the device management controller using a bus, where the second diagnostic information acquiring request is encapsulated in the third MCTP packet. The bus may be the first bus in the system shown in any one of FIG. 1 to FIG. 4. The device management controller sends the third MCTP packet to the switching device to obtain the diagnostic information of the managed device.

Step 204: The switching device sends the diagnostic information to the device management controller.

The switching device encapsulates, in a fourth MCTP packet according to the third MCTP packet in which the second diagnostic information acquiring request is encapsulated, the diagnostic information stored in a memory, and sends the diagnostic information to the device management controller.

In this embodiment, a memory and a bus are added to a switching device to collect and store diagnostic information of a managed device, all diagnostic information is then sent to a device management controller, and the device management controller performs device management on the managed device. In this way, a problem of processing performance deterioration caused by device management performed by a CPU of a server is resolved. In addition, in this embodiment, all NVMe subsystems can exchange diagnostic information with the switching device by reusing only an existing bus, and no additional system hardware line is added.

Figure 8:
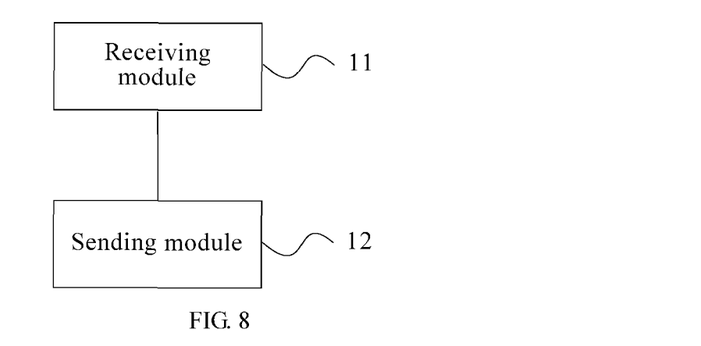
FIG. 8 is a schematic structural diagram of an embodiment of a switching device according to the present disclosure.

FIG. 8 is a schematic structural diagram of an embodiment of a switching device according to the present disclosure. As shown in FIG. 8, the apparatus of this embodiment may include a receiving module 11 and a sending module 12. The receiving module 11 is configured to receive diagnostic information sent by a managed device, where the diagnostic information is used to indicate a software or hardware version or a running status of the managed device. The sending module 12 is configured to send the diagnostic information to a device management controller.

The apparatus of this embodiment may be configured to execute the technical solution of the method embodiment shown in FIG. 5 or FIG. 7. Implementation principles and technical effects thereof are similar, and no more details are described herein.

Further, the sending module 12 is further configured to send a first diagnostic information acquiring request to the managed device, so that the managed device sends the diagnostic information to the switching device according to the first diagnostic information acquiring request.

Further, the sending module 12 is specifically configured to broadcast a first MCTP packet to the managed device, where the first diagnostic information acquiring request is encapsulated in the first MCTP packet, so that the managed device acquires the diagnostic information according to the first diagnostic information acquiring request, and the managed device encapsulates the diagnostic information in a second MCTP packet and sends the diagnostic information to the switching device.

Further, the receiving module 11 is specifically configured to receive the second MCTP packet, and parse the second MCTP packet to obtain the diagnostic information.

Further, the receiving module 11 is further configured to receive a second diagnostic information acquiring request sent by the device management controller.

Further, the receiving module 11 is specifically configured to receive a third MCTP packet sent by the device management controller, where the second diagnostic information acquiring request is encapsulated in the third MCTP packet; and the sending module 12 is specifically configured to encapsulate the diagnostic information in a fourth MCTP packet according to the third MCTP packet and send the diagnostic information to the device management controller.

Further, the switching device is a PCIe switching device, the managed device includes at least one of a CPU or a NVMe controller, and the device management controller is a BMC.

Figure 9:
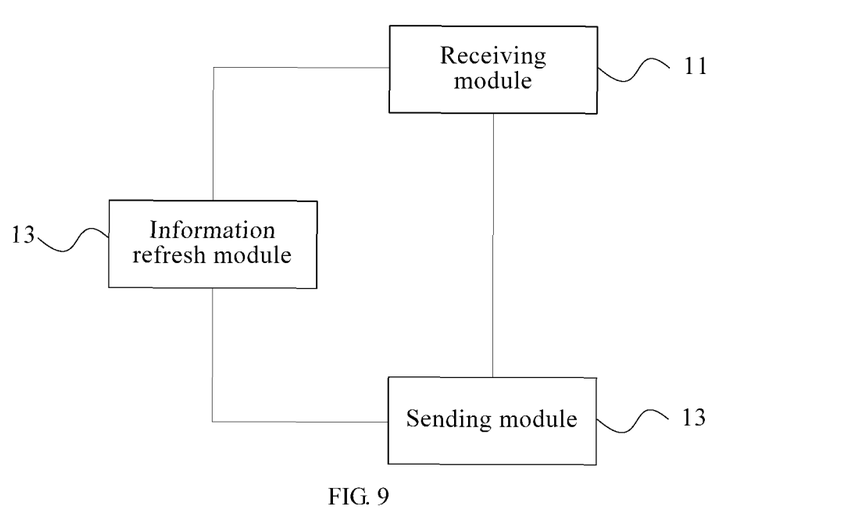
FIG. 9 is a schematic structural diagram of another embodiment of a switching device according to the present disclosure.

FIG. 9 is a schematic structural diagram of another embodiment of a switching device according to the present disclosure. As shown in FIG. 9, on the basis of the apparatus structure shown in FIG. 8, the apparatus of this embodiment may further include an information refresh module 13. The information refresh module 13 is configured to adjust diagnostic information refresh frequency of the storage module according to a preset configuration.

The apparatus of this embodiment may be configured to execute the technical solution of the method embodiment shown in FIG. 5 or FIG. 7. Implementation principles and technical effects thereof are similar, and no more details are described herein.

Figure 10:
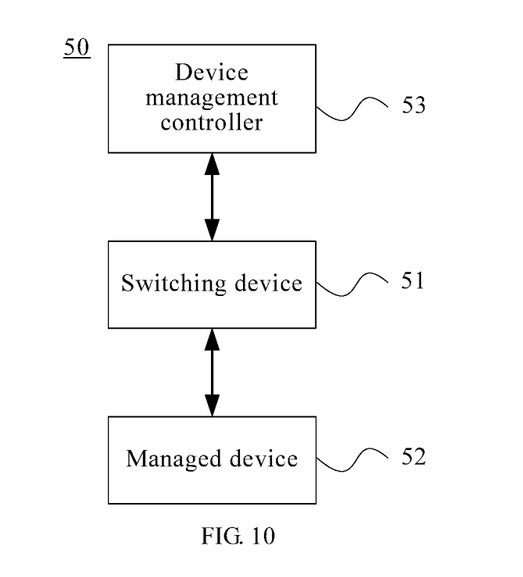
FIG. 10 is a schematic structural diagram of a fifth embodiment of a device management system according to the present disclosure.

FIG. 10 is a schematic structural diagram of a fifth embodiment of a device management system the present disclosure. As shown in FIG. 10, the system 50 of this embodiment includes a switching device 51, a managed device 52, and a device management controller 53. The switching device 51 is connected to the device management controller 53 using a first bus. The switching device 51 is connected to the managed device 52 using a second bus. For the switching device 51, the device shown in FIG. 9 or FIG. 10 is used. Accordingly, the switching device 51 can execute the technical solution of the method embodiment shown in FIG. 5 or FIG. 7. Implementation principles and technical effects thereof are similar, and no more details are described herein.

The switching device 51 of this embodiment may be the switching device 11 in the system shown in any one of FIG. 1 to FIG. 4. The managed device 52 may be any one of the CPU 12 and the three NVMe controllers 131a, 131b, and 131c in the system shown in any one of FIG. 1 to FIG. 4. The device management controller 53 may be the device management controller 14 in the system shown in any one of FIG. 1 to FIG. 4. The first bus may be the first bus in the system shown in any one of FIG. 1 to FIG. 4. The second bus may be the second bus in the system shown in any one of FIG. 1 to FIG. 4.

Further, the switching device 51 may further include a register, where the register is configured to adjust diagnostic information refresh frequency of a memory according to a preset configuration.

Figure 11:
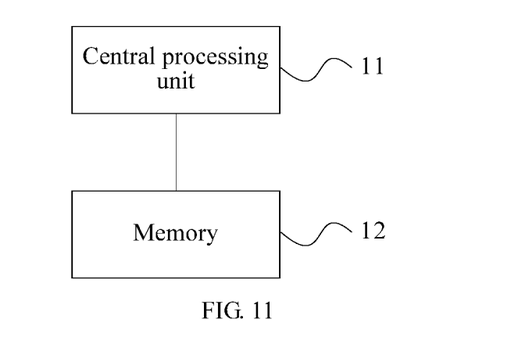
FIG. 11 is a schematic structural diagram of still another embodiment of a switching device according to the present disclosure.

FIG. 11 is a schematic structural diagram of still another embodiment of a switching device according to the present disclosure. As shown in FIG. 11, the device of this embodiment may include a central processing unit 11 and a memory 12. The central processing unit 11 communicates with the memory 12 using a bus. The memory 12 stores a computer executable instruction. The central processing unit 11 executes the computer executable instruction to execute the technical solution of the method embodiment shown in FIG. 5 or FIG. 7. Implementation principles and technical effects thereof are similar, and no more details are described herein.

It should be noted that the present disclosure is derived from an NVMe technology, and the foregoing embodiments mainly describe technical solutions that device management is performed in an NVMe architecture. However, the present disclosure is not limited to the NVMe architecture, but also applicable to such architectures as a serial attached small computer system interface (SAS), a serial advanced technology attachment (SATA), and the like. A switching device or a switching chip assumes functions of a switching device, to implement collection and storage of diagnostic information of a managed device with the help of a corresponding protocol, and a BMC then manages the managed device. For example, a host bus adapter (HBA) is used as a switching device to collect diagnostic information from an SAS hard disk or an SATA hard disk. Then, the diagnostic information is sent to the BMC using a bus, or the diagnostic information is sent to another central switching chip and then sent to the BMC using a bus. The BMC completes device management for the SAS hard disk or the SATA hard disk.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A device management method, comprising:
   receiving, by a switching device from a managed device, diagnostic information comprising an indication of at least one of a software version, a hardware version, or a running status of the managed device; and
   sending, by the switching device to a device management controller, the diagnostic information,
   wherein before receiving the diagnostic information, the method further comprises sending, by the switching device, a diagnostic information acquiring, request to the managed device requesting the managed device sends the diagnostic information to the switching device,
   wherein sending the diagnostic Information acquiring request comprises broadcasting, by the switching device, a first multi-channel transmission platform (MCTP) packet to the managed device, the diagnostic information acquiring request encapsulated in the first MCTP packet, die method further comprising receiving, by the switching device from die managed device, a second MCTP packet comprising the diagnostic information.

2. The method of claim 1, further comprising parsing the second MCTP packet to obtain the diagnostic information.

3. The method of claim 1, wherein the switching device is a Peripheral Components Interface express (PCIe) switching device, wherein the managed device comprises at least one of:
   a central processing unit (CPU) of a server; or
   a Non-volatile Memory express (NVMe) controller,
   and wherein the device management controller is a baseboard management controller (BMC).

4. The method of claim 1, wherein sending the diagnostic information comprises bypassing a central processing unit (CPU) coupled to the switching device.

5. A switching device, comprising:
   an interface; and
   a processor coupled to the interface, wherein the processor is configured to perform the following steps using the interface:
   receiving diagnostic information from a managed device, the diagnostic information comprising an indication of a least one of a software version, a hardware version, or a running status of the managed device; and
   sending the diagnostic information to a device management controller, wherein the processor is further configured to send a diagnostic information acquiring request to the managed device requesting the diagnostic information from the managed device, wherein the processor is further configured to broadcast a first multi-channel transmission platform (MCTP) packet to the managed device, the diagnostic information acquiring request encapsulated in the first MCTP packet.

6. The device of claim 5, wherein the processor is further configured to:
receive a second MCTP packet; and
parse the second MCTP packet to obtain the diagnostic information.

7. The device of claim 5, wherein the switching device is a Peripheral Components Interface express (PCIe) switching device, wherein the managed device comprises at least one of:
a central processing unit (CPU) of a server; or
a Non-volatile Memory express (NVMe) controller, and
wherein the device management controller is a baseboard management controller (BMC).

8. The switching device of claim 5, wherein sending the diagnostic information comprises bypassing a central processing unit (CPU) coupled to the switching device.

9. A device management method, comprising:
receiving, by a switching device from a managed device, diagnostic information comprising an indication of at least one of a software version, a hardware version, or a running status of the managed device; and
sending, by the switching device to a device management controller, the diagnostic information,
wherein before sending the diagnostic information, the method further comprises receiving, by the switching device, a diagnostic information acquiring request from the device management controller,
wherein receiving the diagnostic information acquiring request comprises receiving, by the switching device, a first multi-channel transmission platform (MCTP) packet sent by the device management controller, the diagnostic information acquiring request encapsulated in the first MCTP packet, and
wherein sending the diagnostic information to the device management controller comprises:
encapsulating, by the switching device, the diagnostic information in a second MCTP packet responsive to the first MCTP packet; and
sending the second MCTP packet to the device management controller.

* * * * *